(12) United States Patent
Kurlagunda et al.

(10) Patent No.: US 10,439,549 B2
(45) Date of Patent: Oct. 8, 2019

(54) VEHICLE ATTACHED PHOTOVOLTAIC CHARGING SYSTEMS

(71) Applicants: Ravi Nagarajarao Kurlagunda, Fremont, CA (US); Rohini Raghunathan, Fremont, CA (US)

(72) Inventors: Ravi Nagarajarao Kurlagunda, Fremont, CA (US); Rohini Raghunathan, Fremont, CA (US)

(73) Assignees: Ravi Nagarajarao Kurlagunda, Fremont, CA (US); Rohini Raghunathan, Fremont, CA (US)

( * ) Notice: Subject to any disclaimer, the term of this patent is extended or adjusted under 35 U.S.C. 154(b) by 203 days.

(21) Appl. No.: 15/248,950

(22) Filed: Aug. 26, 2016

(65) Prior Publication Data
US 2017/0063290 A1 Mar. 2, 2017

Related U.S. Application Data

(60) Provisional application No. 62/210,142, filed on Aug. 26, 2015.

(51) Int. Cl.
| | |
|---|---|
| *H02S 20/30* | (2014.01) |
| *H02J 7/35* | (2006.01) |
| *H02S 30/20* | (2014.01) |
| *H02S 40/36* | (2014.01) |
| *B60L 8/00* | (2006.01) |

(52) U.S. Cl.
CPC .............. *H02S 20/30* (2014.12); *B60L 8/003* (2013.01); *H02J 7/355* (2013.01); *H02S 30/20* (2014.12); *H02S 40/36* (2014.12)

(58) Field of Classification Search
USPC ......................................................... 320/101
See application file for complete search history.

(56) References Cited

U.S. PATENT DOCUMENTS

| | | |
|---|---|---|
| 2,975,868 A | 3/1961 | Long |
| 4,592,436 A | 6/1986 | Tomei |
| 5,545,261 A | 8/1996 | Ganz et al. |
| 5,725,062 A | 3/1998 | Fronek |
| 6,586,668 B2 | 7/2003 | Shugar et al. |
| 8,701,800 B2 | 4/2014 | Hui et al. |
| 8,851,560 B1 * | 10/2014 | Freeman .................. B60J 11/04 296/210 |
| 2008/0100258 A1 | 5/2008 | Ward |
| 2008/0143292 A1 * | 6/2008 | Ward ...................... B60L 8/003 320/101 |
| 2009/0288891 A1 * | 11/2009 | Budge .................... B60K 16/00 180/2.2 |
| 2010/0193261 A1 | 8/2010 | Freeman |
| 2012/0073885 A1 * | 3/2012 | Glynn .................... B60K 16/00 180/2.2 |
| 2014/0214249 A1 | 7/2014 | Freeman |
| 2014/0297072 A1 | 10/2014 | Freeman |

* cited by examiner

*Primary Examiner* — Robert Grant
(74) *Attorney, Agent, or Firm* — Heslin Rothenberg Farley & Mesiti P.C.; Victor A. Cardona, Esq.

(57) ABSTRACT

A photovoltaic electric vehicle charging system includes an enclosure to receive photovoltaic panels and the photovoltaic panels connected to each other via a plurality of connecting members inside the enclosure. A sliding mechanism moves panels in and out of the enclosure and the enclosure is configured to be mounted on a vehicle or embedded within the vehicle.

22 Claims, 18 Drawing Sheets

VEHICLE ATTACHED PHOTOVOLTAIC CHARGING SYSTEMS

CROSS-REFERENCE TO RELATED APPLICATIONS

This application claims priority to U.S. Provisional Application No. 62/210,142 filed on Aug. 26, 2015, the entire disclosure of which is incorporated herein by reference.

FIELD OF THE INVENTION

This invention is related to the field of electric vehicle (EV) charging systems. More specifically this application relates to a design for a novel photovoltaic system that is attached to an electric vehicle and is used to charge a battery system of the vehicle.

DESCRIPTION OF THE RELATED ART

Even through the initial versions of the electric vehicles were introduced in the 1990's, adoption of these vehicles in general was muted given the limited driving ranges of these vehicles. However, with improvements in battery technologies and the introduction of the all-electric vehicles from Tesla motors in 2008 (with a 200-mile range) and the Nissan Leaf in 2010 (with an 80-mile range) that the industry has seen increasing adoption of the electric vehicles. However, two fundamental barriers still remain to the rapid adoption of these vehicles: (a) cost and (b) driving range. Tesla's Model S addresses the range issue with its 265-mile range, but boasts an expensive price tag. Nissan's Leaf on the other hand is a much more affordable car but is limited in its driving range leading to range anxiety amongst consumers.

In addition to the higher price of an electric car, consumers also care about the operating costs of the vehicle, which is primarily driven by cost of charging the car. Consumers typically charge the car when the car is parked at work during the day, which is when peak tariff rates apply. Offsetting this charge could result in substantial cost savings for the consumer.

There are been reasonable efforts taken to address the range anxiety concerns of an EV consumer. For example, development of fast chargers and wireless chargers allow rapid and convenient charging at the home. Also, the emergence of EV charge stations at malls, work places and other public areas has facilitated the charging of electric vehicles outside the home. Despite all these efforts, infrastructure changes have been limited and slow to come and one cannot reliably find a charge station outside the home when needed. Range anxiety remains a key consideration in a consumer's decision to purchase an electric car.

This innovation addresses both concerns highlighted above, namely, range anxiety and high cost. The proposed system uses photovoltaic technology in a smart, effective and innovative way to allow charging of the electric car directly from the sun when the car is parked outside. To date, there has been limited innovation related to the use of photovoltaic in charging electric vehicles. Most of the innovations in the industry have focused around building photovoltaic car ports which are used to both provide covered parking for the car and also charge the electric vehicle. However, this requires infrastructure build out which has been slow to come.

There has also been some work done in the area of photovoltaic charging systems attached to small vehicles that need limited power to run, like golf carts or boats. U.S. Pat. No. 6,586,668 B2 and U.S. Pat. No. 5,725,062 A are examples of such photovoltaic systems used to power golf carts. A fundamental constraint these systems have is that they are restricted in size by the area available on roof of the vehicle and hence limited in the extent of power they can generate.

In order to overcome the space limitation, some research has been done on expandable solar system on the roof of a car with publications going as far back as 1986. U.S. Pat. No. 4,592,436 A, illustrates a system in which two stacks of photovoltaic panels are mounted on the top of a battery powered vehicle. The lower stack is fixed and remains attached to the vehicle, while the upper stack can be pivoted out to expand surface area available for generating power from the solar system. However most expandable solar charging systems are not commercially viable for one or many reasons as listed below:

(a) Most of these systems only contain one additional stack of solar panels and expand only in one direction. Such limited expansion does not generate sufficient power generation for meaningful travel of the vehicle.
(b) If the systems multiple stack of solar panels, the mechanism used to expand the panel require a lot of room to maneuver the panels or the expanded system has a foot print that is so large that does not allow for safe operation in standard parking spaces, or
(c) Most of these systems do not have the required intelligence built in, like detecting obstruction near the vehicle, to safely operate the vehicle under all conditions.

For example, in U.S. Pat. No. 4,592,436 A listed above, the top stack of solar panels needs to be pivoted out in order to expand the system. Pivoting panels require much more space as it expands and this leads to fundamental constraints on space needed around the vehicle for safe operations.

Patent No. US 20080100258 A1, is another example of prior publications in the area of expandable solar charging systems. However, this publication only provides for expansion of one additional solar panel and hence the expanded surface area is very limited. Also, the author in this publication uses a screw and gear mechanism for expansion which can be very slow to operate in real time.

Other examples of expanding systems are shown in U.S. Pat. No. 8,851,560 B1 and Patent No. US 20140214249 A1. However, most of these large expandable systems have fundamental problems of being able to deploy on standard vehicles in standard parking spaces. In Patent No. US 20140214249 A1, the author describes fundamental changes required to the vehicle itself which makes it impractical to commercially deploy on standard vehicles. Additionally, the configuration described in the publication has a footprint greater than the size of the vehicle even in the un-deployed position, which could be impractical in spaced constrained parking conditions. U.S. Pat. No. 8,851,560 B1, the design requires a multi-layer roof structure, which could involve substantial changes to the vehicle chassis and also be impractical to deploy in standard parking lots.

SUMMARY OF THE INVENTION

The present invention provides a smart and commercially deployable, electric vehicle attached, expandable photovoltaic charging system. The expandable configuration maximizes the power generated from the system thereby reducing or eliminating the need for charging the vehicle from the power grid. This system can be either a retrofit solution, such as a compact enclosure that is mounted on a vehicle, or an embedded system which is built-in within the chassis of an electric vehicle itself.

The system consists of an enclosure that houses the photovoltaic panels and is electrically connected to the battery system of the electric vehicle. As indicated earlier, this enclosure can either be mounted on a vehicle or embedded inside the vehicle. The photovoltaic panels slide out of the enclosure, when needed, expanding the photovoltaic footprint in order to increase the power generated by the system.

The photovoltaic panels may be mounted on railings or arms that slide in and out of the enclosure, for example. The panels may be expanded and retracted by various triggers, including but not limited to, (a) a remote control system, (b) detection of motion on the vehicle on which they are mounted, (c) detection of other obstructions during operation and/or (d) other sensors embedded in the device.

DETAILED DESCRIPTION OF THE DRAWINGS

Figure 1:
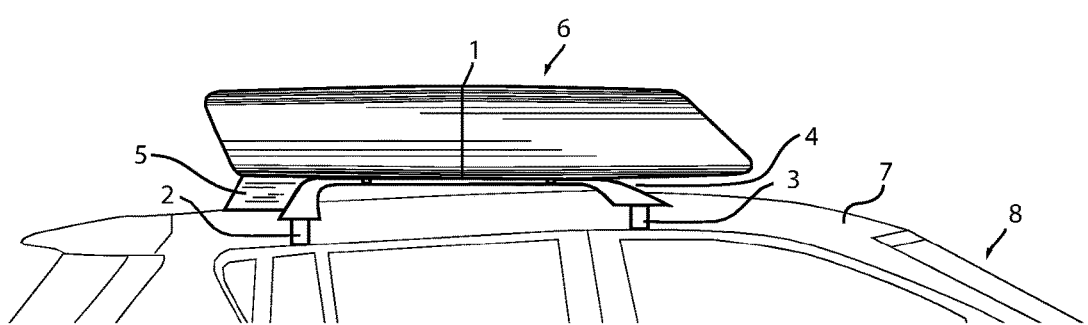
FIG. 1 is a side view of a non-embedded photovoltaic charging system mounted on the vehicle in accordance with the present invention.

FIG. 1 illustrates a side view of a non-embedded photovoltaic charging system 6 mounted on top of a vehicle 8. This figure illustrates how an enclosure 1 is mounted or attached to a roof 7 of vehicle 8. The mounting of a non-embedded photovoltaic charging system 6 to a roof 7 of vehicle 8 may be made via multiple configurations. For example, the charging system 6 may be directly attached to built-in roof racks on vehicles using a clamping mechanism at locations 2, 3, 4 and 5 as shown in FIG. 1. Alternatively, in vehicles without an integrated roof rack, such a charging system may be designed to clamp around a door frame or windows of such vehicles. While the illustration depicts solar charging systems that are mounted on the roof of the vehicle, the application covers any such system that may be mounted on or within other parts of the vehicle as well.

Photovoltaic panels used in this system may be lightweight flexible panels. The use of lightweight flexible panels (e.g., silicon panels) coupled with lightweight railings allow the enclosure that houses the panels to be compact in form which is critical for mounting the system on a vehicle.

Figure 2:
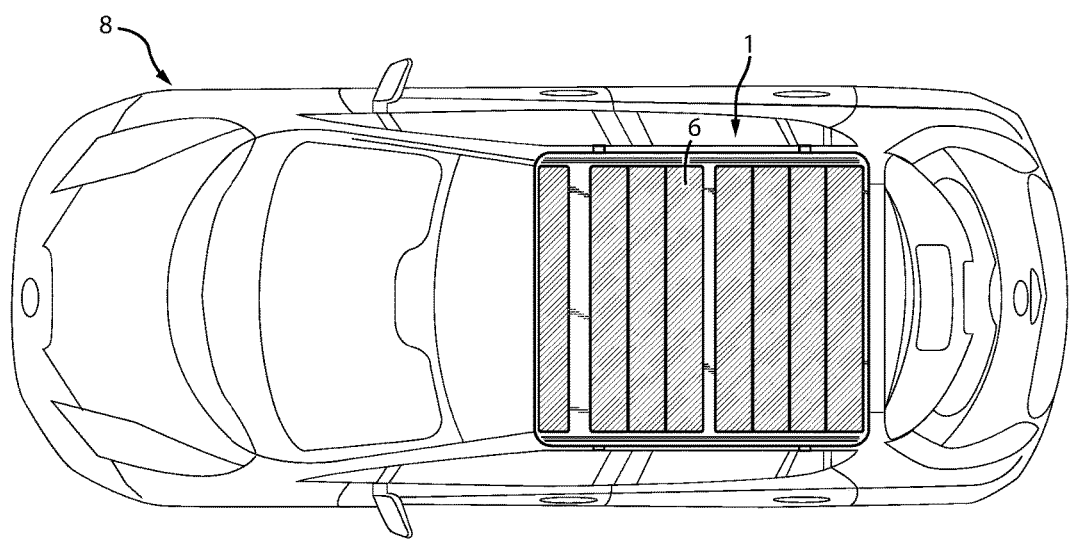
FIG. 2 is a top-down view of the non-embedded photovoltaic charging system of FIG. 1 in the retracted state.

FIG. 2 illustrates a top view of non-embedded vehicle attached photovoltaic charging system 6 when the system is in a retracted state. In this configuration, a top surface of enclosure 1 may be embedded with a single or a plurality of photovoltaic panels that may charge the system at all times. When the vehicle 8 is parked and ready to charge, additional panels may slide out of enclosure 1 to form an expanded system which may then start charging.

Figure 3:
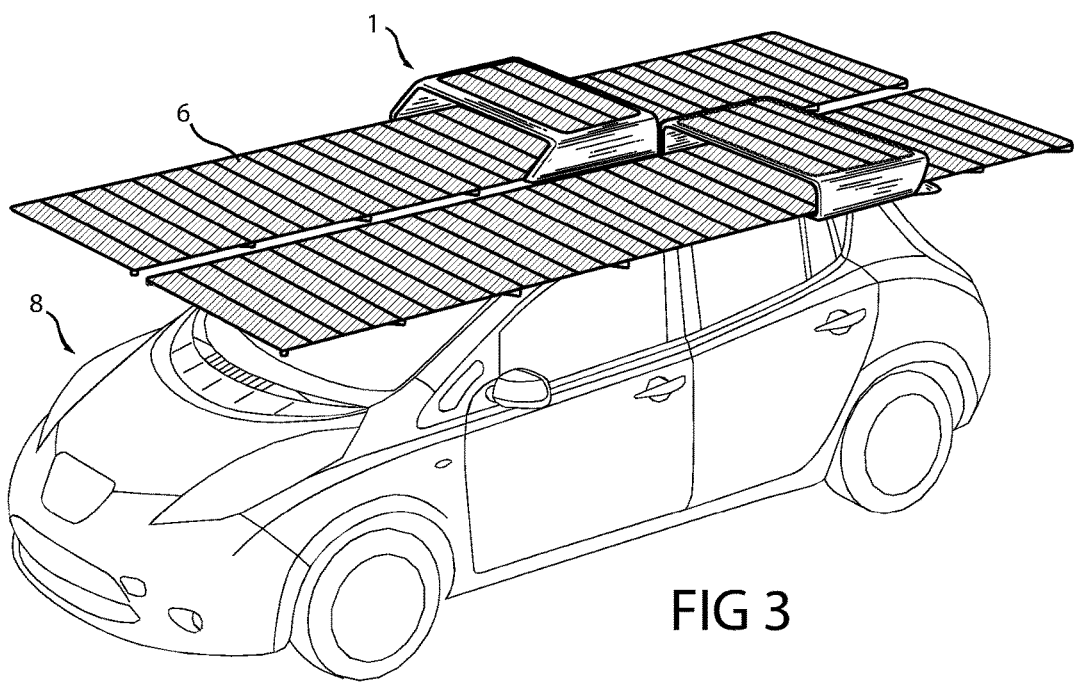
FIG. 3 is a top-down view of the non-embedded photovoltaic charging system of FIG. 1 in the expanded state.

FIG. 3 illustrates a top view of charging system 6 in a fully expanded state.

Figure 4:
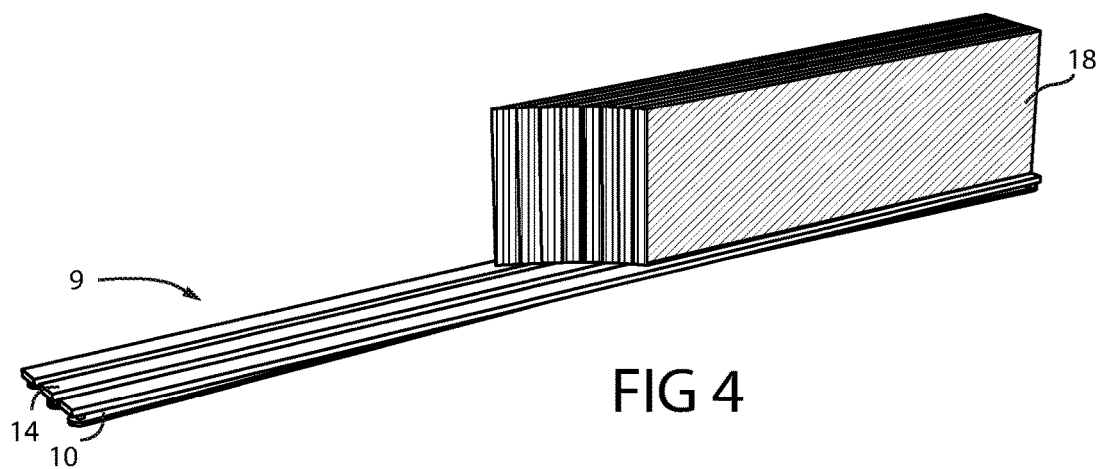
FIG. 4 illustrates a "Scissor Mechanism" used for the expansion of a photovoltaic charging system in accordance with an aspect of the present invention.
Figure 5:
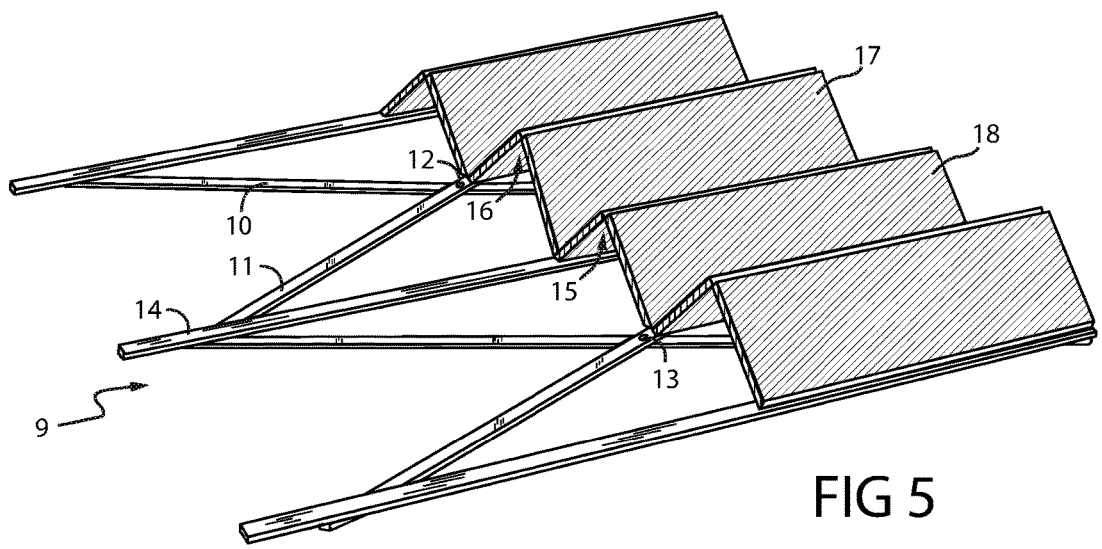
FIG. 5 illustrates a "Scissor Mechanism" used for the expansion of a photovoltaic charging system in accordance with an aspect of the present invention.
Figure 6:
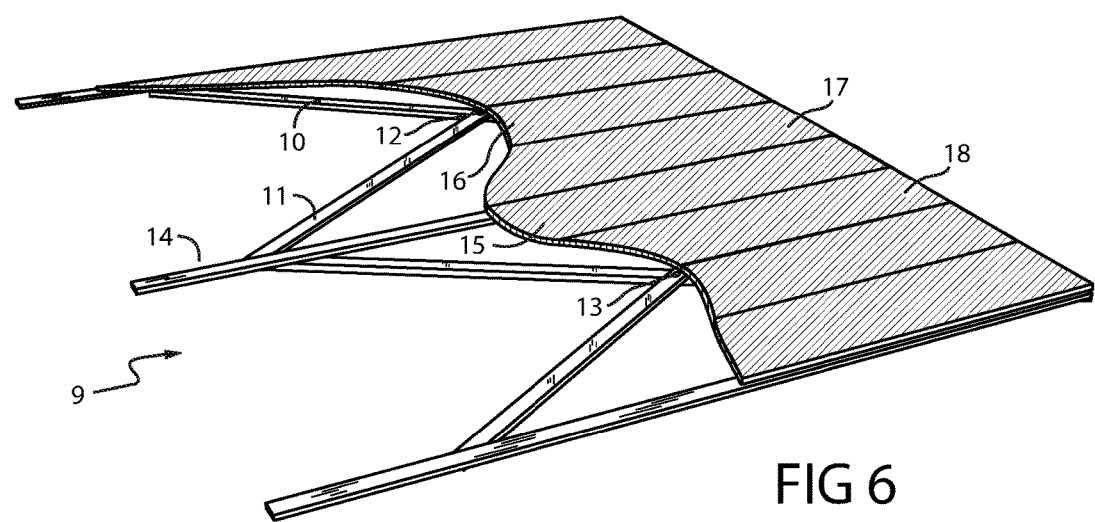
FIG. 6 illustrates a "Scissor Mechanism" used for the expansion of a photovoltaic charging system in accordance with an aspect of the present invention.

FIG. 4, FIG. 5 and FIG. 6 illustrate a "Scissor Mechanism" 9 which may be one of several mechanisms for the expansion of a photovoltaic charging system (e.g., system 6). The basic fundamentals of a scissor mechanism comprising two scissor columns is disclosed in U.S. Pat. No. 2,975,868, incorporated herein by reference. Each link in the scissor mechanism includes a plurality of pairs of arms 10, 11 pivotally interconnected at cross over point 12 in a scissor-like fashion so as to extend and retract as the arms pivot between the front end and the back end of the charging system (e.g., system 6). To enable larger expansion, multiple scissor like structures may be utilized together such that the structures repeat themselves and are pivotally interconnected with each other, at ends 14 thereof for example, to form a diamond like structure, illustrated in FIGS. 4-6. In this embodiment, multiple solar panels 15, 16, 17 and 18, for example (e.g., silicon solar panels) are stacked vertically between cross over points 12 and 13 of two adjacent scissor units, and may be mechanically connected the scissor arms as shown in FIG. 4, FIG. 5 and FIG. 6. The panels may be mechanically connected to the arms using conventional connections, such as nuts and bolts or other simple fasteners as required. In alternate embodiments, the panels may be anchored to the scissor railing or arms (e.g., arms 10, 11) by stringing a rope, string, cable or rod, through the bottom of a plurality of panels and securing such rope, cable, string or rod to both ends of the scissor mechanism (e.g., scissor mechanism 9), This rope, string, cable, or rod may be wound up and down as the scissor expands. This additional fastening would aid in making the panels stay anchored securely to the railings or arms below as the solar charging system expands and contracts. While the illustrations depict only four panels (i.e., panels 15, 16, 17 and 18) between two cross over points (i.e., points 12, 13) in FIG. 4, FIG. 5 and FIG. 6, alternate embodiments may include fewer or more solar panels stacked between panels cross over points (e.g., cross over points 12, 13) that are mechanically connected to each other as described above.

In a retracted or closed state, shown in FIG. 4, the panels are stacked vertically next to each other and a diamond-like structure between 12 and 13 (FIG. 5 and FIG. 6) of the scissor mechanism is wide and narrow bringing cross over points 12, 13 between two adjacent scissors structures close to each other, as shown in FIG. 4. A trigger to expand the charging system (e.g., system 6) may be provided using a transmitting device (e.g., a car key remote) which is received by a receiver embedded within the charging system (e.g., system 6). Upon the detection of the trigger signal by the receiver, a motor driven scissor mechanism may be activated in the charging system (e.g., system 6) and the scissor structure of mechanism 9 may start to narrow and elongate thereby moving the two adjacent cross over 12, 13 points away from each other.

As cross over points 12, 13 move away from each other, free ends of panels 15, 16, 17, 18 connected to these crossover points may be pulled apart from each other. As the panels are pulled apart, they start to tilt and slide down leading to an expansion of the system as shown in FIG. 5. In summary, the vertically stacked panels (i.e., as depicted in FIG. 4) tilt up and down as the scissor mechanism underneath it opens and closes. When fully expanded all the panels lie completely flat horizontally positioned adjacent to each other allowing for maximum charging area as shown in FIG. 6.

Figure 7:
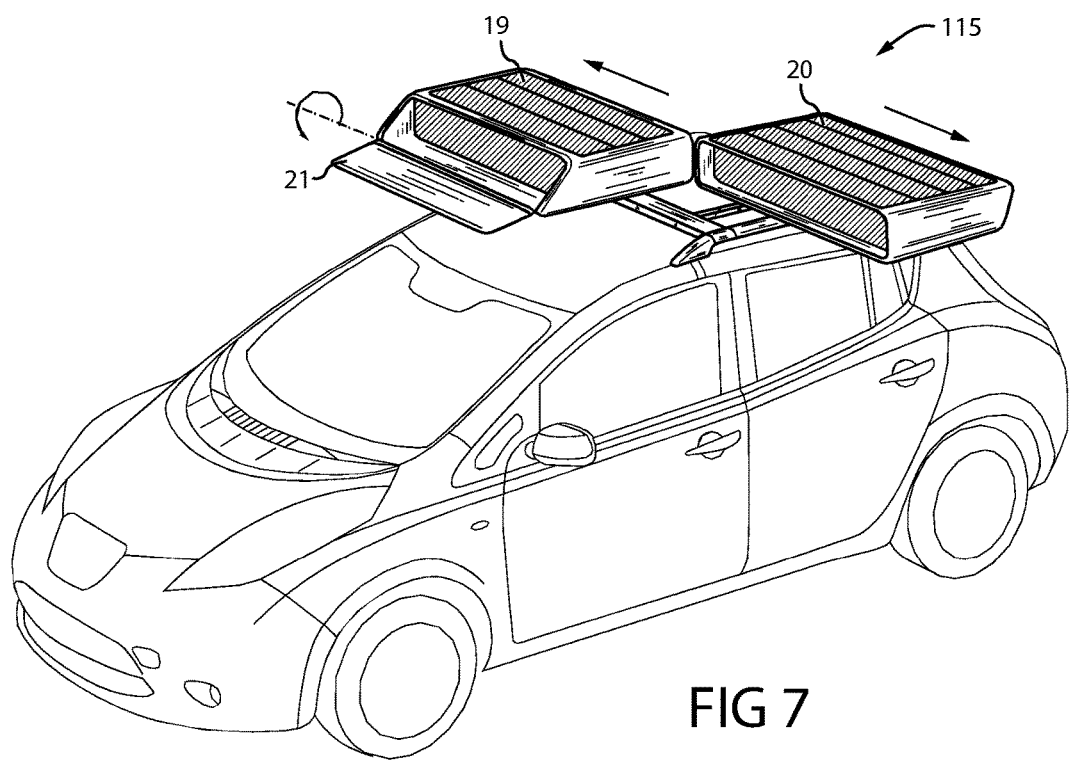
FIG. 7 illustrates a sideways movement of two enclosures in the "Double Scissor Mechanism" of FIG. 4 used to expand the overall width of a charging system.
Figure 8:
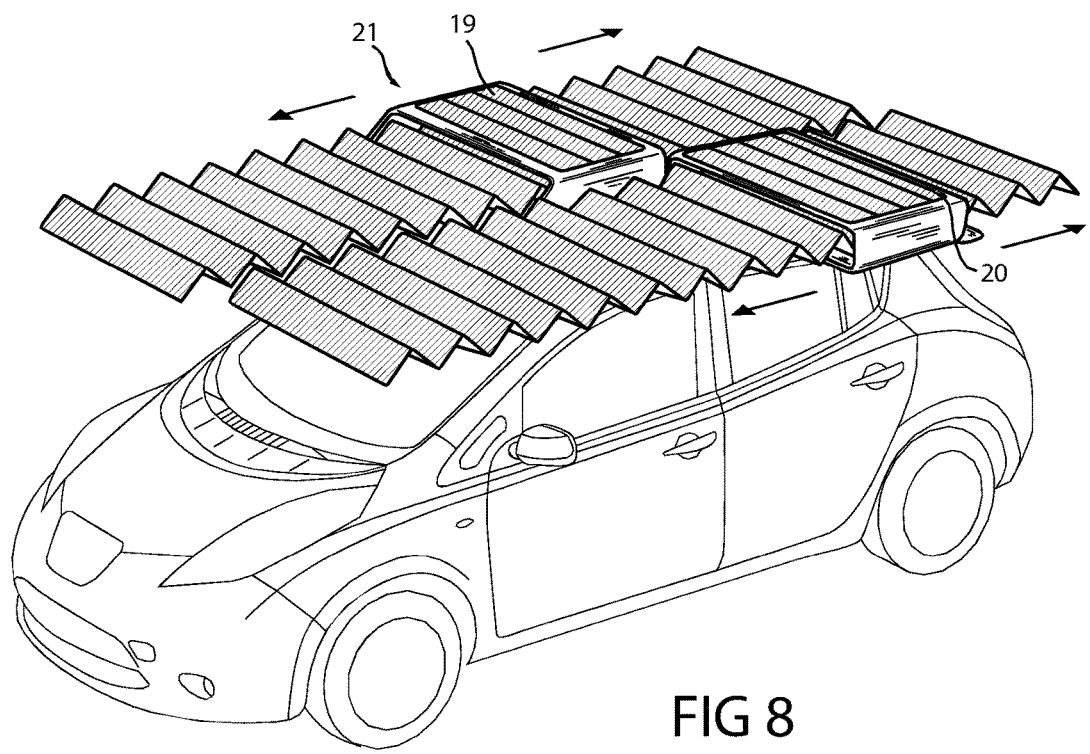
FIG. 8 illustrates unfolding of the panels from within the two enclosures of a photovoltaic charging system using the "Double Scissor Mechanism" of FIG. 7.

FIG. 7 and FIG. 8 illustrate in another example, a "Double Scissor Mechanism" 115 which is a variation of "Scissor Mechanism" 9 described above. This mechanism allows a footprint of the photovoltaic charging system to be extended beyond the roof of the vehicle to increase the active area and charge generated by the system. In order to achieve the additional expansion, a charging system 21, may utilize two enclosures 19, 20 stacked one behind the other in a retracted state. When the expansion of charging system 21 is activated, enclosures 19, 20 separate out as illustrated in FIG. 8, so that they are positioned adjacent but staggered behind one another. Solar panels stacked within the two enclosures then each expand using scissor mechanism 9 described above, as shown in FIG. 8, allowing for a wider footprint than what would be allowed by just the width of the vehicle roof.

Figure 13:
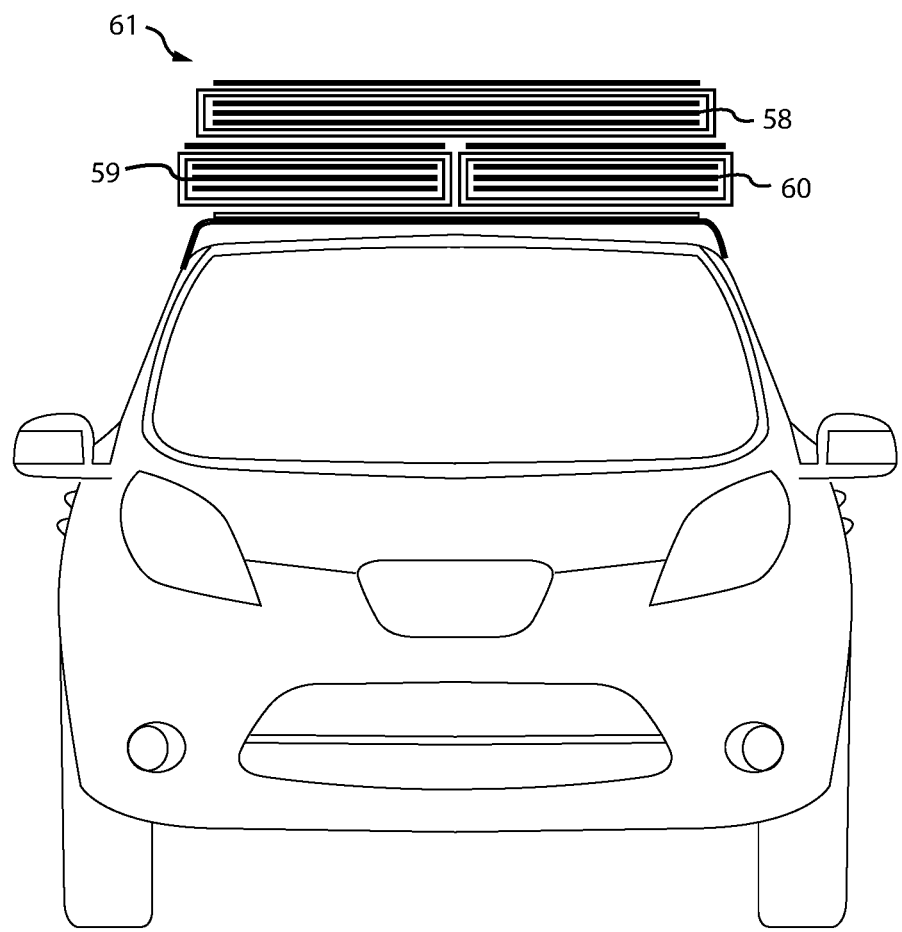
FIG. 13 illustrates an alternate structure of a "Sliding System" using three different enclosures that slide out to expand the footprint of the photovoltaic charging system in accordance with an aspect of the invention.

While the embodiment depicted in FIG. 8 uses two enclosures (i.e., enclosures 19, 20), it is also possible to use more than two enclosures in various combinations to widen an overall footprint of a charging system. For example, of a charging system 61 may include a larger enclosure (58) could be stacked above two smaller enclosures (59, 60) as shown in FIG. 13. The two smaller enclosures (i.e., enclosures 59, 60) may be moved laterally out on either side of the larger enclosure 58 to widen an overall footprint of charging system 61. Panels may then slide out of each of these enclosures (i.e., enclosures 58, 59, 60) each using the scissor mechanism 9 described above to enable the overall expansion of the system.

Figure 9:
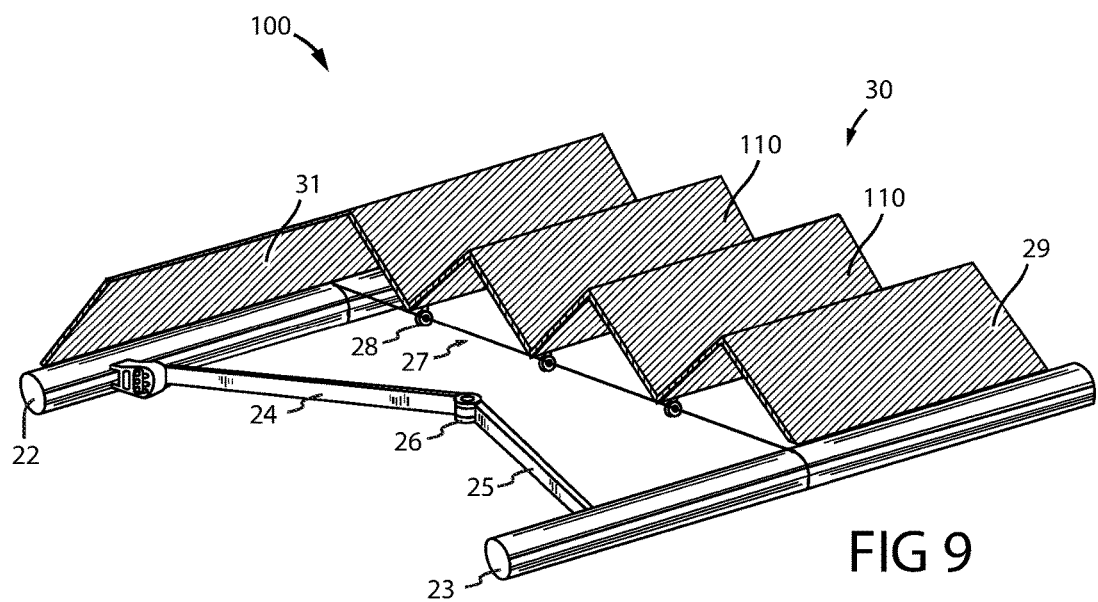
FIG. 9 illustrates a "Retracting Arm Mechanism" used to expand the photovoltaic charging system of FIG. 1 in accordance with an aspect of the invention.

Another mechanism that could be used as an alternative to the "Scissor Mechanism" described above and depicted in FIGS. 4-6 for the expansion of a charging system is a "Retracting Arm Mechanism" 30 illustrated in FIG. 9. An expansion of mechanism 30 may be achieved using hinged retractable arms that swing in and out to retract or expand the system. For example, a frame bar 22 and a lead bar 23 are connected at both ends by two rods 24, 25 shown on one end (and another similar pair of arms attached on the other end that is not shown), joined together by hinge, 26 for example, that the rods pivot around as shown in FIG. 9. A vertical stack 100 of solar panels 110 connected to each other may be positioned above retracting arm mechanism 30 with the lead bar 23 mechanically attached to a last solar panel 29 of stack 100 while frame bar 22 is mechanically attached to the first solar panel 31 of stack 100. In a closed position, frame bar 22 lead bar 23, and the two connecting arms 24, 25 at one end, and another identical set of arms at the other end, are all positioned close to each other with the solar panels stacked together vertically above them and mechanically connected to each other as shown.

The expansion of a charging system (e.g., system 6) utilizing mechanism 30 (FIG. 9) may be triggered by a remote control device that uses, for example, a transmitter to activate, a receiver in the charging system that may be coupled to an electrical motor and a linear actuator connected to lead bar 23. As the signal is provided by the transmitter in the remote device, the receiver triggers the linear actuator to extend, which moves lead bar 23 out as shown in FIG. 9 pulling last solar panel 29 with the lead bar and subsequently all the other solar panels in the stack along with the lead bar to enable an expansion of the solar charging system (e.g., system 6). Similarly, when a retraction of the charging system (e.g., system 6) is triggered, lead bar 23 starts to move towards the frame bar 22 pushing on the last solar panel 29. This in turn triggers the collapse of all the solar panels attached to the last solar panel 29 toward frame bar 22 leading to a desired retraction of the system. The panels may be interconnected at the bottom of the panel via an opening in each panel, for example an opening 28, using a rod, a cable, or a string 27 that is attached to the lead bar, railings or arms below and may be wound up or down as the system expands and contracts. This will allow the panels to stay anchored to the railing, lead bar, system or other anchoring point at the bottom of the enclosure or otherwise.

Alternative configurations of the charging system using the "Retracting Arm Mechanism" 30 or the "Scissor Mechanism" 9 may use hydraulic, pneumatic, or mechanical actuation as an alternative to or in conjunction with the electrical actuation described above relative to FIGS. 4 and 9, for example. Also, the system may be designed to have a backup/override mechanism that uses a manual mechanical actuator, to fold/unfold the panels in the event the electrical actuator system fails in another example.

Figure 10:
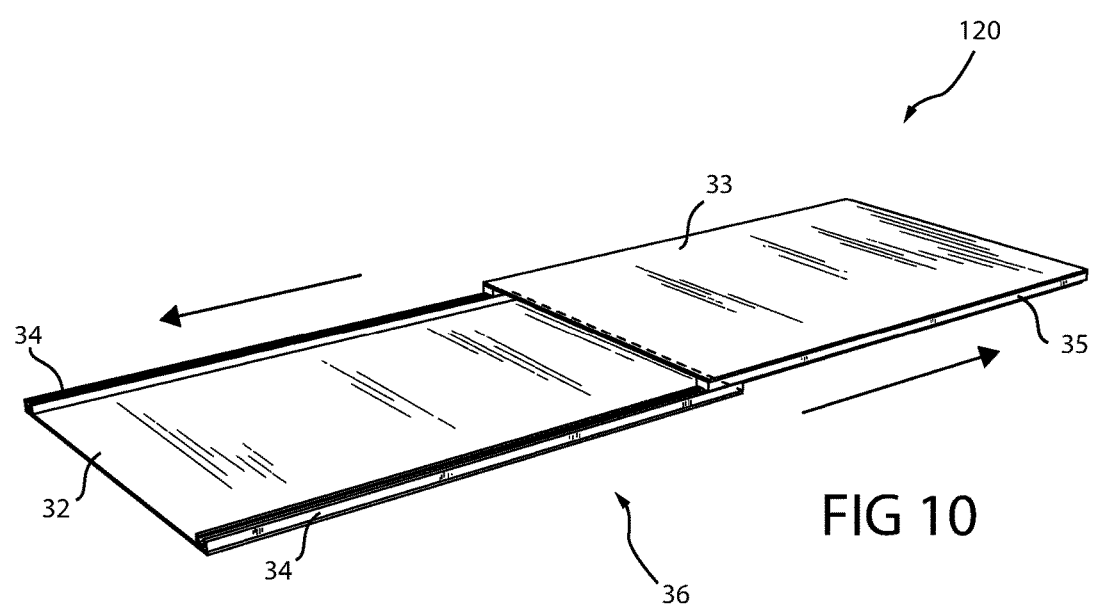
FIG. 10 illustrates a telescopic sliding mechanism used to expand the photovoltaic charging system of FIG. 1 in accordance with an aspect of the invention.
Figure 11:
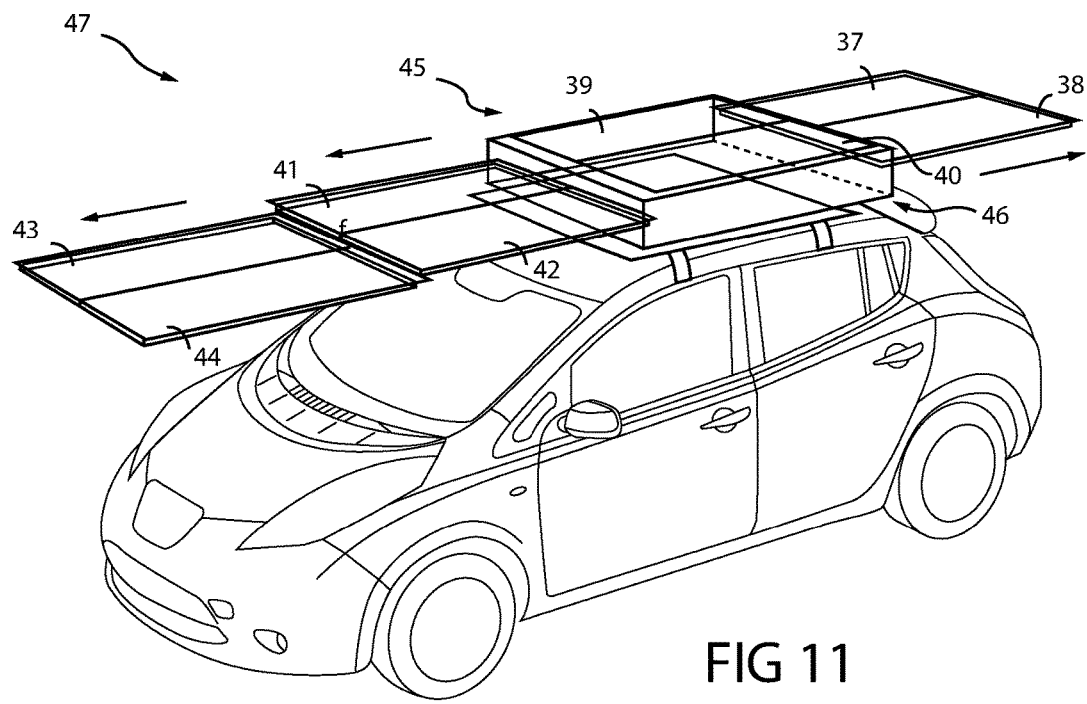
FIG. 11 illustrates the movement of panels lengthwise from within the enclosure to expand the footprint of the photovoltaic charging system using a "Sliding Mechanism" in accordance with an aspect of the invention.

An expansion of a photovoltaic charging system 120 may also be achieved using a "Sliding Mechanism" 36, as illustrated in FIG. 10. In this type of system, solar panels 32, 33 are attached to railings 34, 35 respectively that are telescopically interlinked and can slide between each other through the channels in the railings as shown in FIG. 10 (e.g., a projection of one of railings 35 may be received in a channel of one of railings 34). A solar charging system 45 is designed using several such interconnected panels (e.g., utilizing system 120) that are stacked one on top of another within the enclosure 46 shown in FIG. 11. When activation is triggered using a transmitting device, like a remote key, panels start to slide out from within the enclosure 46 using the sliding mechanism 36 illustrated in FIG. 10. A number of stacks of panels inside an enclosure 46 may be variable depending on a size of the panels and dimensions of the vehicle on which it is mounted. In this example, enclosure 46 has two solar panels 39, 40 mounted on an outside surface thereof to charge system 45 at all times as shown in FIG. 11. When expansion is activated for example, using a remote control device that activates a sensor in the charging system (e.g., charging system 45), multiple panels slide out telescopically both in front and behind enclosure 46, driven by an electrical motor (not shown) and linear actuator (not shown). For example, panels 41, 42 slide out telescopically in the front of the enclosure and panels 37, 38 slide out telescopically behind the enclosure as depicted in FIG. 11. A second level of expansion may then be similarly actuated to telescopically slide out panels 43, 44 from panels 41, 42 in the front. All panels are interconnected using telescopic channels or sliding rails, as detailed above, which allow the panels to be linked together and slide out smoothly. Further, alternate configurations of the system may use hydraulic, pneumatic, or mechanical actuation instead of or in conjunction with the electrical actuation described in the example.

Figure 12:
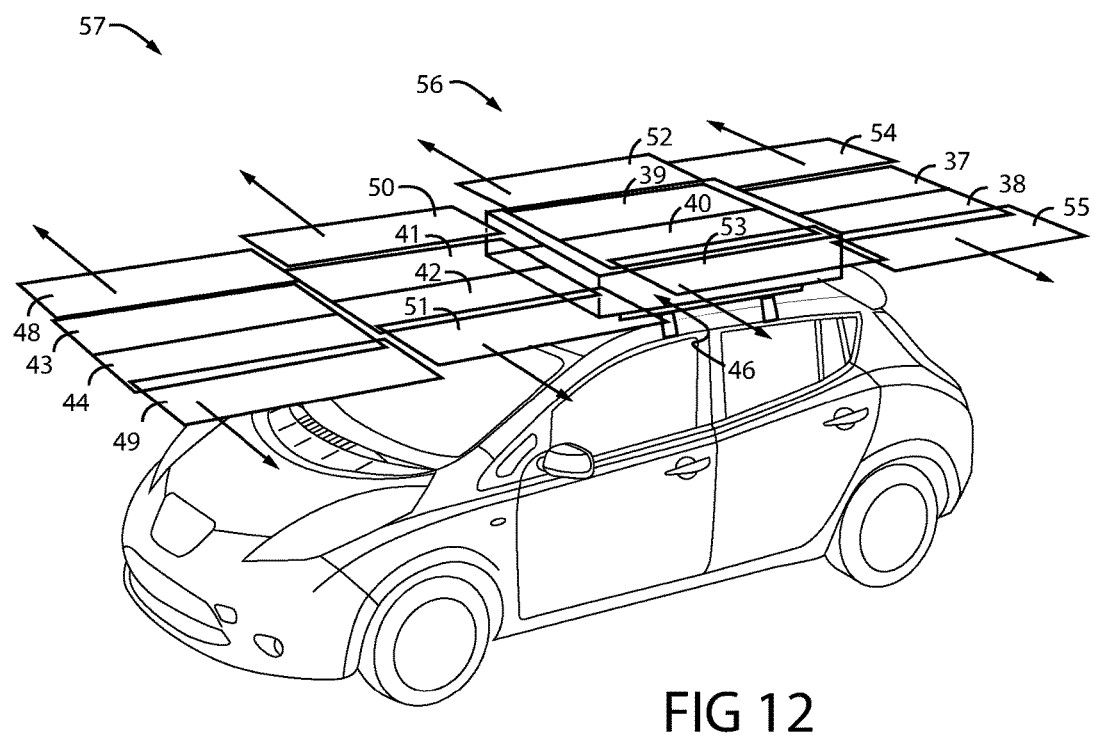
FIG. 12 illustrates the sliding of the panels widthwise after the initial lengthwise expansion illustrated in FIG. 10.

FIG. 12 illustrates another example of a "Sliding Mechanism" 36. In this example after an initial expansion lengthwise as described above, a secondary set of panels may slide out laterally (relative to a longitudinal dimension of vehicle 8) from underneath or above all the panels along a length of an expanded system 56, using similar mechanism as described above relative to sliding mechanism 35. As depicted in FIG. 12, panels 37, 38, 41, 42, 43 and 44 initially slide out of the enclosure as described relative to FIG. 11. In a second level of expansion, a set of panels 48, 49 telescopically slide out laterally from panels 43, 44 to further widen the system footprint. Similarly, panels 50, 51 slide out from panels 41, 42 and panels 54, 55 slide out from panels 37, 38 respectively. In this example, panels 52, 53 slide out from the panels 39, 40 that are mounted or embedded on the enclosure. The secondary set of panels are stacked either above or below the primary set of panels and are attached together using telescopic channels or sliding rails, as described above, attached to the panels which allow the panels to be linked together and slide out smoothly. When activation is triggered using a remote control device, an electrical linear actuator is activated in the structure that may then propel the telescopic channels out. Alternate configurations of the system may use hydraulic, pneumatic, or mechanical actuation instead of or in conjunction with the electrical actuation described above.

Figure 14:
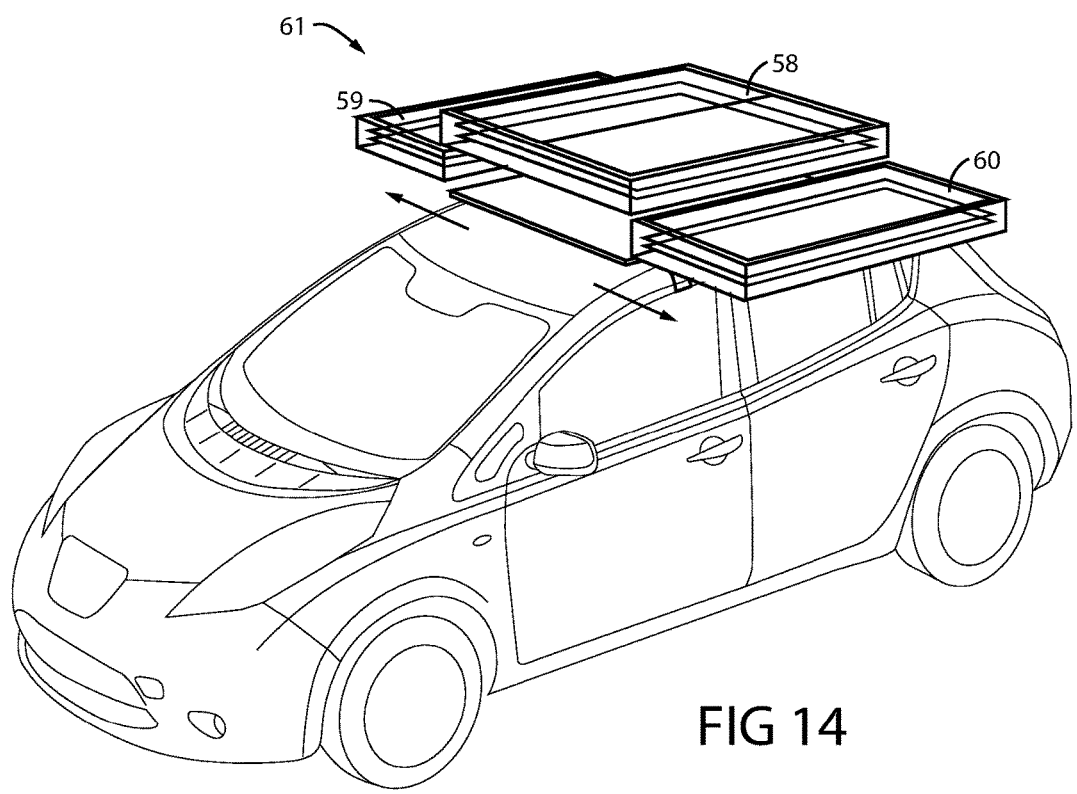
FIG. 14 illustrates movement of the enclosures illustrated in FIG. 12, to enable the widening of the overall footprint of the photovoltaic charging system.
Figure 15:
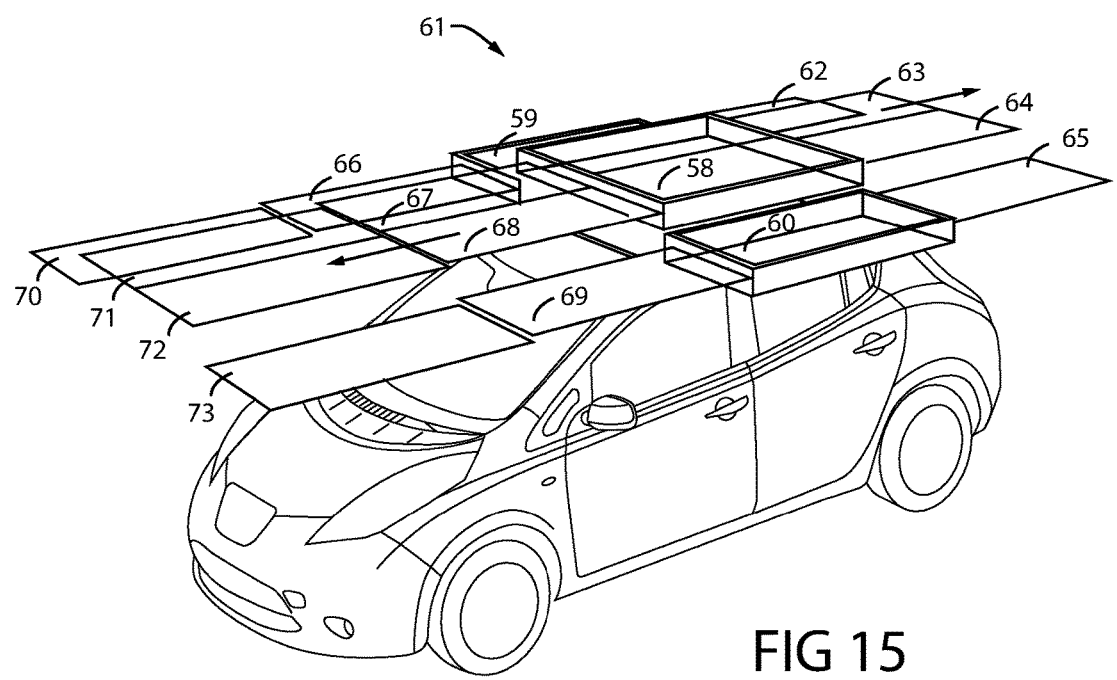
FIG. 15 illustrates a sliding of the panels using a "Sliding Mechanism" from within a three enclosure system to enable the expansion of the photovoltaic charging system in accordance with an aspect of the invention.

FIG. 13, FIG. 14 and FIG. 15 illustrate a system 61 as another variant of the "Sliding Mechanism" illustrated in FIG. 11 and FIG. 12. In this configuration panels are arranged in three separate enclosures—one large 58 and two smaller 59, 60. Smaller lower enclosures 59, 60 are stacked below large enclosure 58 as shown in FIG. 13. The two smaller enclosure may be mounted on railings positioned at the base of the enclosures using telescopic channels or sliding rails which allow the smaller enclosure to be connected to the base and to slide out smoothly. When expansion is triggered, the smaller lower enclosures 59, 60 first slide out laterally, using an electrical linear actuator, as shown in FIG. 13 to expand an overall width of the charging system. The panels stacked inside these enclosures (i.e., panels 62 through 73) then slide out telescopically from the three enclosures as shown in FIG. 14 using the "Sliding Mechanism" 36 described above relative to FIG. 10.

Other variants of a "Sliding Mechanism" 36 described above relative to FIG. 10 may include two enclosures (e.g., enclosures 19, 20), as shown in FIG. 7, that are stacked one behind the other (relative to a longitudinal dimension of a vehicle) that first separate out along the width of the vehicle. The two enclosures may be mounted on railings positioned at a base of a charging system (e.g., system 115) using telescopic channels and/or sliding rails which allow the smaller enclosure to be connected to the base and to slide out smoothly. When expansion is triggered, the enclosures first slide out sideways, using an electrical linear actuator, as shown in FIG. 7 to expand an overall width of the charging system. After the separation of the enclosures, panels stored therein may slide out of the enclosure telescopically using the "Sliding Mechanism" 36 described above relative to FIG. 10.

A charging system (not shown) may include one or multiple enclosures stacked next to or above and below one another and expand using one of the many mechanisms described herein. These enclosures may move initially to widen (relative to a longitudinal dimension of a vehicle) a footprint of such a charging system before an expansion of panels from within the enclosure.

Figure 16:
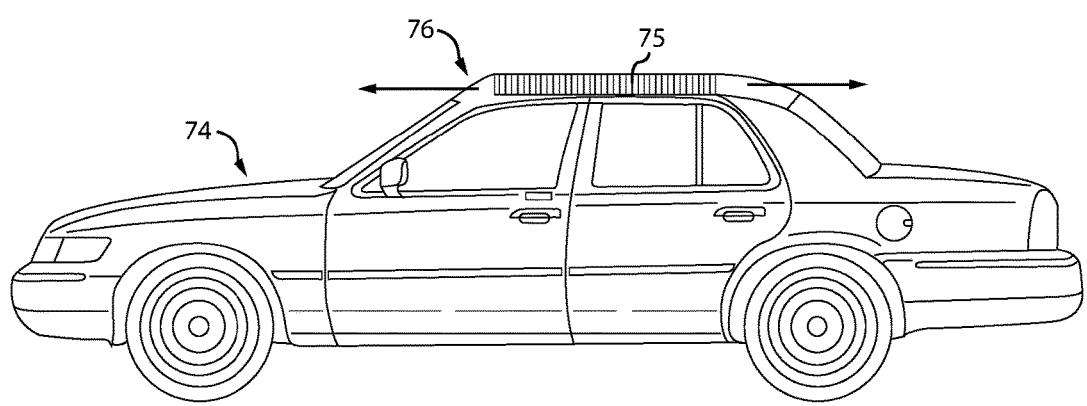
FIG. 16 illustrates an enclosure receiving photovoltaic panels mounted within an interior structure of a vehicle in accordance with an aspect of the present invention.

The above described systems and methods for embedding photovoltaic panels within an enclosure that is mounted on a vehicle such that these panels may then be expanded to form a charging system for the electric vehicle may be extended to configurations where the panels are embedded within, or mounted to, the chassis of the vehicle itself instead of a separate enclosure on a top side thereof. The systems described herein may be expanded using, but not limited to, the various mechanisms described in the present document. For example, a charging system 75 may be embedded within and concealed beneath a roof 76 of a vehicle 74 as shown in FIG. 16. For example, an enclosure such as those described above may be mounted within an interior structure (e.g., a roof) of a vehicle and solar panels in such an enclosure may slide out from the vehicle, (e.g., from underneath the roof) when triggered to expand a charging footprint thereof. Such solar panels may extend outwardly (e.g., longitudinally and/or laterally relative to a longitudinal dimension of a vehicle) from a vehicle in a manner similar to that described above for the solar panels extending from the enclosures described.

Figure 17:
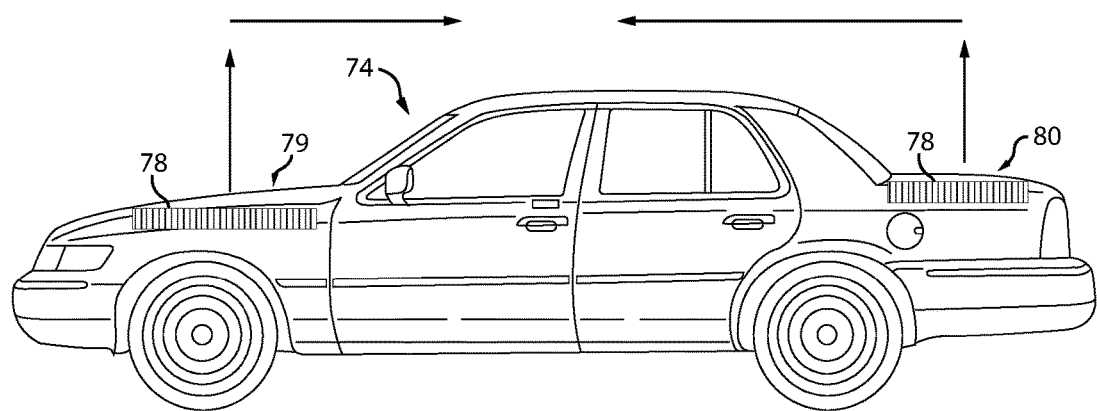
FIG. 17 illustrates a plurality of enclosures receiving photovoltaic panels mounted within front and rear portions of an interior structure of a vehicle in accordance with an aspect of the present invention.
Figure 18:
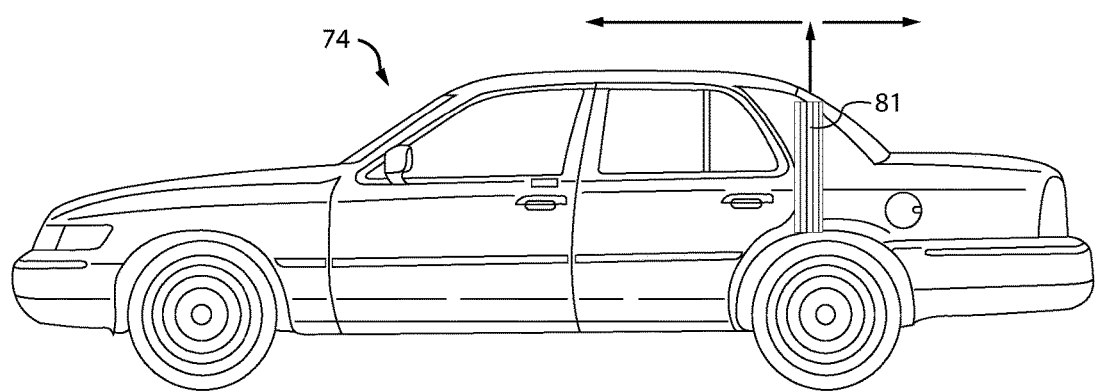
FIG. 18 illustrates an enclosure receiving photovoltaic panels mounted within an interior structure of a vehicle between a back seat portion and a trunk portion of the vehicle in accordance with an aspect of the present invention.

Alternatively, solar charging systems 78, 77 may be mounted, or embedded, beneath a hood 79 or a trunk 80 of vehicle 74, or at both locations, as shown in FIG. 17. The charging system may then be raised (e.g., vertically) or moved up from underneath the chassis of the vehicle (e.g., moved vertically and laterally) using pneumatic, hydraulic, electrical or mechanical actuators and expanded out (e.g., longitudinally and/or laterally relative to a longitudinal dimension of a vehicle) using, but not limited to, the various mechanisms described above. In another example, as shown in FIG. 18, a charging system with solar panels 81 may be stacked vertically in an area between a backseat and a trunk of a vehicle. This stack of panels may then slide up (e.g., using pneumatic, hydraulic, electrical or mechanical actuators) and out (e.g., laterally, such as the solar panels described above) to form a solar canopy on the car that is used to charge the battery of the vehicle.

Further, although the systems (e.g., system 6, system 21, system 45, system 56, system 61) for charging an energy storage device and/or electrical vehicle using photovoltaic energy described above use various mechanisms (e.g., mechanism 9, mechanism 30, mechanism 115, mechanism 36) for storing and extending photovoltaic panels of such system, other systems and methods for containing photovoltaic panels connected to or embedded in a vehicle such that the panels may be protected from the elements when not in use and extended for use when desired may be utilized in accordance with this invention.

Further, the above described structures (e.g., arms 10, 11, rods 24, 25, hinges 26, lead bar 23, frame bar 22) may be made of any material (e.g., aluminum, stainless steel, composite) configured to support the weight of a plurality of standard silicon based solar panels and/or thin film (e.g., cadmium telluride), organic, or any other type of solar panels that may be utilized to generate electricity. Further, the enclosures described above, and structures of a vehicle for mounting the enclosure, may also be configured or reinforced to support such photovoltaic panels.

In addition to the systems, methods and mechanisms described above, various sensors may be utilized to provide intelligence needed to safely operate the photovoltaic charging systems described above as listed below:
  (a) The sensors may expand or retract the charging system based on a signal from remote control.
  (b) The system may either not expand or begin to retract if a sensor detects obstruction near the vehicle.
  (c) The system may have sensor(s) that can detect the opening of the driver side door or motion of the vehicle to start the retraction of the panels.
  (d) Additionally, the system may have sensor(s) to detect adverse weather conditions such as high wind or hail and the panels may be retracted under these circumstances.
  (e) The system may have the ability to provide orientation of the panel to provide the driven with the optimal direction in which to park the vehicle This intelligence that is built into the system is critical to ensure safe and reliable operation of this system and will enable the use to safely deploy these systems in standard parking spaces.

Of course, the details of construction and the embodiments may vary widely with respect to what has been described and illustrated herein, without thereby departing from the sphere of protection of the present invention, as defined in the annexed claims.

We claim:

1. A photovoltaic vehicle charging system comprising:
  an enclosure to receive a plurality of photovoltaic panels therein in a non-use position;
  an expansion mechanism to move the plurality of panels in and out of the enclosure;
  the enclosure configured to be mounted on a chassis of a vehicle;
  each photovoltaic panel of said plurality of photovoltaic panels hingedly connected to an adjacent photovoltaic panel of said plurality of photovoltaic panels such that said plurality of photovoltaic panels is expandable to an in-use position by the expansion mechanism in an expansion direction such that solar active surfaces of said plurality of photovoltaic panels are located to generate electricity and retractable to a non-use position such that opposite longitudinal ends and opposite lateral sides of each panel of said plurality of photovoltaic panels are aligned with said adjacent photovoltaic panel of said plurality of photovoltaic panels in a direction parallel to the expansion direction and said plurality of photovoltaic panels generate less electricity than when said plurality of photovoltaic panels are in said in-use position.

2. The photovoltaic vehicle charging system as recited in claim 1, further comprising a plurality of solar cells attached to a top of the enclosure.

3. The photovoltaic vehicle charging system as recited in claim 2, further comprising a receiver connected to a motor to drive the sliding mechanism to move the panels in and/or out of the enclosure, the receiver configured to receive a signal from a remote controlled device to move the panels in and/or out of the enclosure.

4. The photovoltaic vehicle charging system as recited in claim 1, further comprising a sensor wherein a retraction of the panels into the enclosure is triggered by the sensor detecting an obstruction too near the vehicle.

5. The photovoltaic vehicle charging system as recited in claim 1, further comprising a sensor wherein a retraction of the panels into the enclosure is triggered by the sensor detecting motion of the vehicle on which the sensor is mounted.

6. The photovoltaic vehicle charging system as recited in claim 1, further comprising a sensor wherein a retraction of the panels into the enclosure is triggered by the sensor detecting weather conditions that could potentially cause damage to the system and the vehicle if the panels remain in an expanded form.

7. The photovoltaic vehicle charging system as recited in claim 1, further comprising a detector to determine a removal of the enclosure from a chassis of the vehicle and to trigger a safety alarm.

8. The photovoltaic vehicle charging system as recited in claim 1, wherein the enclosure is mounted within a chassis of the vehicle.

9. The photovoltaic vehicle charging system as recited in claim 1, wherein the enclosure is mounted between a rear seat and a trunk of the vehicle.

10. The photovoltaic vehicle charging system as recited in claim 1, wherein the sliding mechanism is configured to move the panels out of the enclosure laterally and longitudinally relative to a longitudinal dimension of the vehicle.

11. The photovoltaic vehicle charging system as recited in claim 1 wherein the enclosure comprises a forward position and a rear portion, the forward position and the rear portion configured to laterally move relative to each other and relative to a longitudinal dimension of the vehicle.

12. The photovoltaic vehicle charging system as recited in claim 1 wherein the panels are connected to a first member at a first lateral end of the panels and a second member at a second lateral end of the panels, the panels having a connecting eyelet receiving a cable to hold the panels to each other and the first member and the second member.

13. The photovoltaic vehicle charging system as recited in claim 1 wherein the sliding mechanism comprises a first connecting member connected to a first panel of the panels and a second connecting member connected to a second panel of the panels, the first connecting member having an projecting member received in a channel of the second connecting member to moveably connect the first panel to the second panel.

14. A method for use in generating electricity in a vehicle comprising:
  mounting an enclosure for photovoltaic panels to an electric vehicle;
  receiving a plurality of photovoltaic panels connected to each other within the enclosure in a non-use position;

each photovoltaic panel of the plurality of photovoltaic panels hingedly connected to an adjacent photovoltaic panel of the plurality of photovoltaic panels;

extending the plurality of photovoltaic panels by an expanding mechanism to an in-use position such that solar active surfaces of the plurality of photovoltaic panels are located to generate electricity from ambient solar radiation;

generating electricity using the plurality of photovoltaic panels in the in-use position; and retracting the plurality of photovoltaic panels by the expanding mechanism to the non-use position such that opposite longitudinal ends and opposite lateral sides of each panel of said plurality of photovoltaic panels are aligned with said adjacent photovoltaic panel of said plurality of photovoltaic panels in a direction parallel to the expansion direction and the plurality of photovoltaic panels generate less electricity than when the plurality of photovoltaic panels are in the in-use position.

15. The method of claim 14 further comprising attaching a plurality of solar cells to a top of the enclosure.

16. The method of claim 14 wherein the mounting the enclosure comprises mounting the enclosure on an outside surface of a chassis of the vehicle.

17. The method of claim 14 further comprising a sensor causing a retraction of the plurality of panels into the enclosure based on the sensor sensing an ambient condition near the enclosure that could cause damage to a panel of the plurality of panels or the enclosure.

18. The method of claim 14 wherein the extending the plurality of photovoltaic panels comprises extending the plurality of panels longitudinally and laterally relative to a longitudinal dimension of the vehicle.

19. The method of claim 14 further comprising a forward portion and a rear portion of the enclosure moving laterally relative to one another prior to the extending of the plurality of panels.

20. The method of claim 14 wherein extending comprises moving a first connecting member of the sliding mechanism relative to a second connecting member of the sliding mechanism, the first connecting member connected to a first panel of the plurality of panels and a second connecting member connected to a second panel of the plurality of panels, the first connecting member having an projecting member received in a channel of the second connecting member to moveably connect the first panel to the second panel.

21. The system of claim 1 wherein a first photovoltaic panel of said plurality of photovoltaic panels comprises a first longitudinal side hingedly connected to a second photovoltaic panel of said plurality of photovoltaic panels and a second longitudinal side hingedly connected to a third photovoltaic panel of said plurality of photovoltaic panels.

22. The system of claim 1 further comprising a plurality of scissor arms supporting said plurality of photovoltaic panels to allow said plurality of photovoltaic panels to move from said in-use position to said non-use position.

* * * * *